United States Patent
Manwaring et al.

(10) Patent No.: US 7,611,165 B2
(45) Date of Patent: Nov. 3, 2009

(54) ADJUSTABLE STEERING COLUMN ASSEMBLY HAVING AN ATTACHED INSTRUMENT CLUSTER

(75) Inventors: Marvin V. Manwaring, Clio, MI (US); Richard K. Riefe, Saginaw, MI (US); Ravi Ravindra, Saginaw, MI (US); William D. Cymbal, Freeland, MI (US); Brad M. MacDonald, Bay City, MI (US); Jason R. Ridgeway, Bay City, MI (US); Albert C. Huber, Montrose, MI (US)

(73) Assignee: Delphi Technologies, Inc., Troy, MI (US)

( * ) Notice: Subject to any disclaimer, the term of this patent is extended or adjusted under 35 U.S.C. 154(b) by 251 days.

(21) Appl. No.: 11/728,072

(22) Filed: Mar. 23, 2007

(65) Prior Publication Data
US 2007/0296195 A1    Dec. 27, 2007

Related U.S. Application Data

(60) Provisional application No. 60/816,174, filed on Jun. 23, 2006.

(51) Int. Cl.
*B62D 1/18* (2006.01)
(52) U.S. Cl. ..................................... 280/775
(58) Field of Classification Search ................ 280/775, 280/777, 779; 74/493; 296/72
See application file for complete search history.

(56) References Cited

U.S. PATENT DOCUMENTS

| 4,527,444 | A | | 7/1985 | McKee et al. |
|---|---|---|---|---|
| 4,690,432 | A | * | 9/1987 | Sakamoto et al. ........... 280/775 |
| 5,067,747 | A | | 11/1991 | Yokoyama |
| 5,088,571 | A | | 2/1992 | Barry et al. |
| 5,461,361 | A | | 10/1995 | Moore |
| 5,497,675 | A | * | 3/1996 | Brown et al. ................... 74/492 |
| 6,223,620 | B1 | * | 5/2001 | Jolley .......................... 74/493 |
| 6,419,269 | B1 | * | 7/2002 | Manwaring et al. ......... 280/775 |
| 6,843,521 | B1 | | 1/2005 | Oana |
| 2003/0057694 | A1 | * | 3/2003 | Manwaring et al. ......... 280/775 |
| 2003/0085560 | A1 | * | 5/2003 | Shibayama .................. 280/777 |
| 2006/0021460 | A1 | * | 2/2006 | Schulz ......................... 74/493 |
| 2006/0273568 | A1 | * | 12/2006 | Manwaring et al. ......... 280/777 |

* cited by examiner

*Primary Examiner*—Lesley D. Morris
*Assistant Examiner*—Robert A. Coker
(74) *Attorney, Agent, or Firm*—Thomas N. Twomey

(57) ABSTRACT

A steering column assembly includes a rake adjustment mechanism, and is attached to a vehicle by a mounting bracket. A rake bracket is coupled to the mounting bracket. A column jacket is collapsible in response to an emergency event and is supported by the mounting bracket and the rake bracket, and is rotationally moveable with the rake bracket about a rake axis relative to the mounting bracket. An instrument cluster is coupled to the rake bracket for movement along with the rake bracket and the column jacket to prevent obstruction of the instrument cluster by a steering wheel upon re-positioning the steering wheel, while not restricting movement of the column jacket during collapse of the column jacket in response to the emergency event. A dynamic absorber interconnects the instrument cluster and the rake bracket to reduce vibration of the steering column assembly caused by additional weight of the instrument cluster.

16 Claims, 8 Drawing Sheets

ADJUSTABLE STEERING COLUMN ASSEMBLY HAVING AN ATTACHED INSTRUMENT CLUSTER

CROSS REFERENCE TO RELATED APPLICATION

This application claims the benefit of U.S. provisional patent application Ser. No. 60/816,174, filed on Jun. 23, 2006, the disclosure of which is herein incorporated by reference.

BACKGROUND OF THE INVENTION

1. Field of the Invention

The subject invention generally relates to a steering column assembly for a vehicle.

2. Description of the Related Art

Vehicles typically include an instrument panel attached to a cross beam extending between a pair of front pillars. An instrument cluster is usually attached to the instrument panel, and is typically located above a steering column assembly. The instrument cluster includes instrumentation necessary for a driver to properly operate the vehicle, such as a speedometer, tachometer, fuel gauge, coolant temperature gauge, etc. The driver views the instrumentation by looking through and around a steering wheel attached to the steering column.

Currently, many vehicles are equipped with adjustable steering column assemblies. The adjustable steering column assemblies may include rake adjustments for adjusting the height of the steering wheel, telescopic adjustments for adjusting the distance of the steering wheel from the driver, or may include both the rake adjustment and the telescopic adjustment. Accordingly, the steering wheel may be positioned in a manner that obstructs the view of the instrumentation of the instrument cluster.

Mounting the instrument cluster on the steering column allows the instrument cluster to move with the steering column in both the rake and the telescoping adjustments. Accordingly, the instrument cluster maintains a fixed spatial relationship relative to the steering wheel, thereby ensuring the driver has a continuous unobstructed view of the instrument cluster regardless of the position of the steering wheel. U.S. Pat. No. 4,527,444 discloses a steering column assembly having both rake and telescopic adjustments with the instrument cluster permanently mounted to the steering column assembly.

Modern vehicles incorporate a collapsible column jacket into the adjustable steering column assemblies, and further include energy absorption mechanisms. The energy absorption mechanisms absorb energy transmitted through the steering column as the steering column collapses along a longitudinal axis in response to an emergency event, such as a vehicular crash.

However, the effectiveness of the energy absorption mechanism is reduced or eliminated by having the instrument cluster permanently mounted to the steering column assembly because the instrument cluster abuts against the instrument panel, thereby restricting movement of the collapsible column jacket. Additionally, the added weight of the instrument cluster onto the steering column assembly increases vibration of the steering column assembly felt by the driver, which is an undesirable effect.

SUMMARY OF THE INVENTION AND ADVANTAGES

The subject invention discloses a steering column assembly for a vehicle. The steering column assembly comprises a mounting bracket for attaching the steering column assembly to the vehicle. A rake bracket is coupled to the mounting bracket, and is pivotable relative to the mounting bracket about a rake axis. The rake bracket extends from the mounting bracket along a longitudinal axis to a distal end. A column jacket is supported by the mounting bracket and detachable supported by the rake bracket. The column jacket is longitudinally moveable relative to the mounting bracket along the longitudinal axis in response to an emergency event. The column jacket is also pivotably moveable with the rake bracket relative to the mounting bracket about the rake axis. An instrument cluster is coupled to the distal end of the rake bracket. The instrument cluster is rotatably moveable with the rake bracket and the column jacket relative to the mounting bracket about the rake axis.

Accordingly, the subject invention provides a steering column assembly in which the instrument cluster is coupled to the rake bracket. The instrument cluster moves with the rake bracket as the steering column assembly is adjusted about the rake axis to maintain an unobstructed view of the instrument cluster. The instrument cluster is not directly mounted onto the column jacket and therefore does not interfere with the collapse of the column jacket in response to the emergency event.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a steering column assembly is generally shown at 20. The steering column assembly 20 is for a vehicle, and includes an energy absorption mechanism 22. The energy absorption mechanism 22 absorbs energy transmitted through a column jacket 24 in response to an emergency event. The emergency event typically includes a vehicular impact. The energy absorption mechanism 22 reduces the amount of energy transmitted through the steering column assembly 20, thereby reducing injury to a driver. There are several energy absorption mechanisms 22 known in the art capable of absorbing energy transmitted through the steering column assembly 20 that may be incorporated into the subject invention. Accordingly, the energy absorption mechanism 22 is not described in detail herein, and the scope of the claims should not be limited to the exact configuration or type of energy absorption mechanism 22 utilized.

Figure 1:
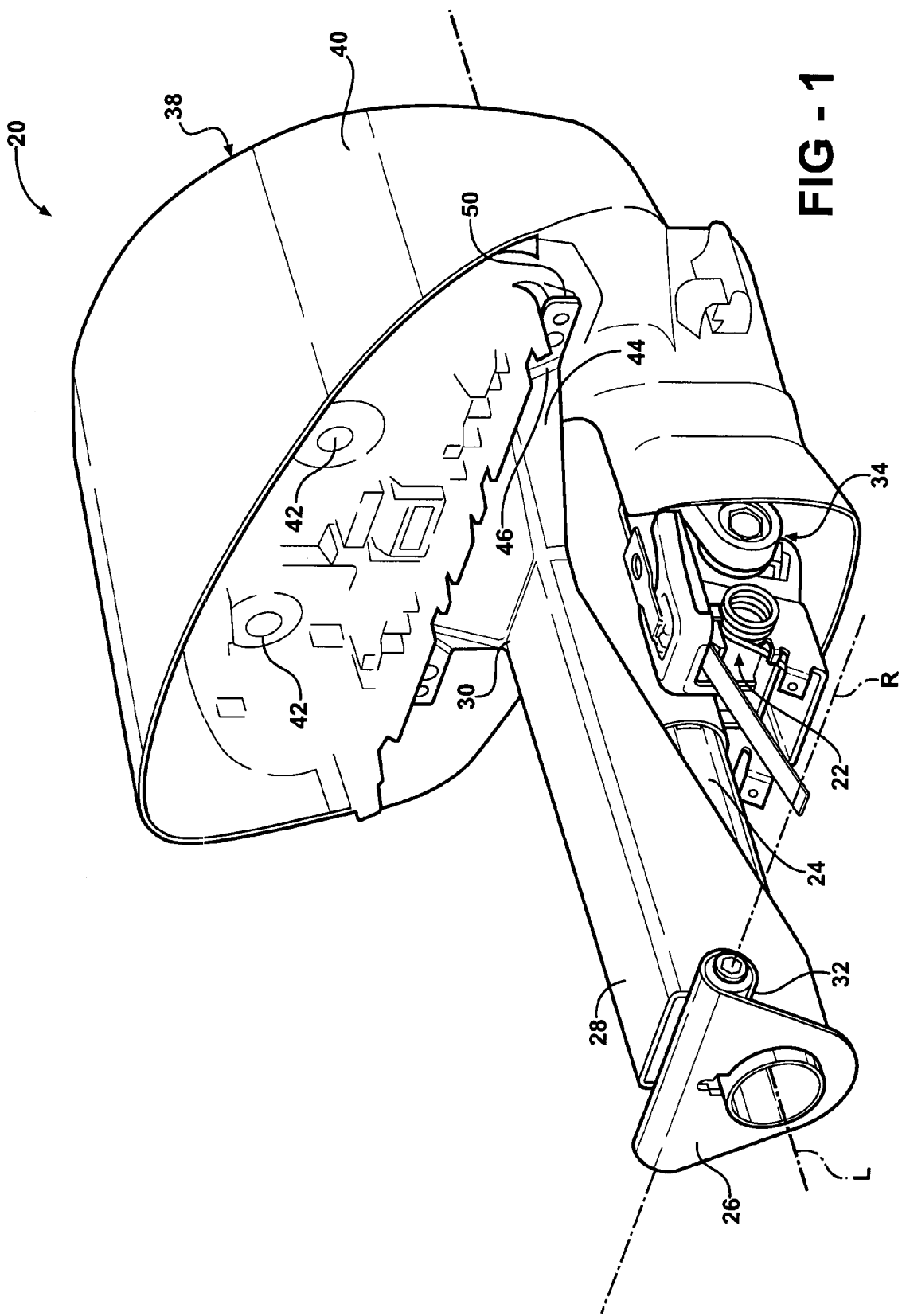
FIG. 1 is a perspective view of a steering column assembly.
Figure 2:
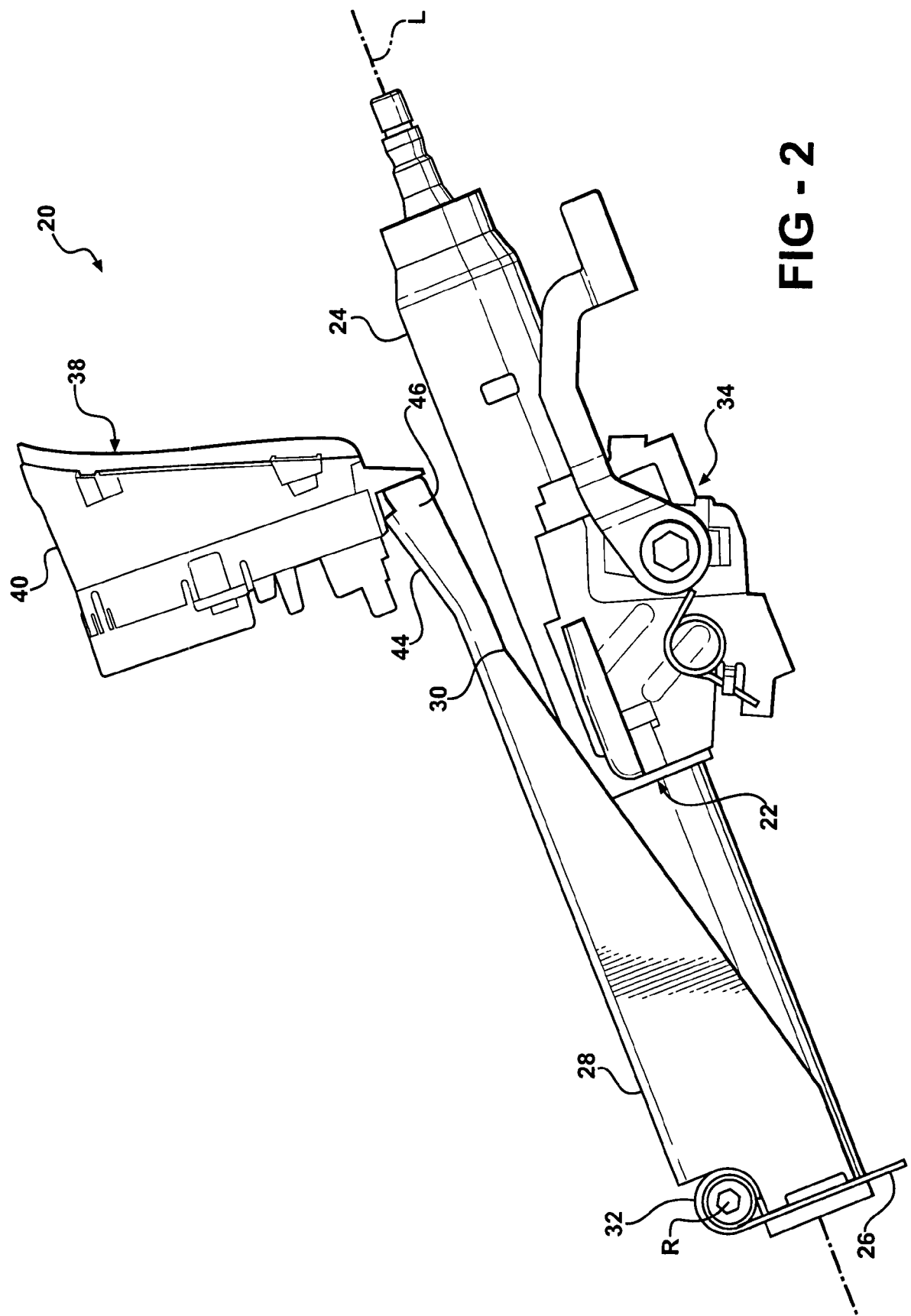
FIG. 2 is a side view of the steering column assembly shown in FIG. 1.

Referring to FIGS. 1 and 2, the steering column assembly 20 comprises a mounting bracket 26 for attachment to the vehicle. A rake bracket 28 is coupled to the mounting bracket 26 and also to the vehicle. The rake bracket 28 is pivotable relative to the mounting bracket 26 about a rake axis R, and extends from the mounting bracket 26 along a longitudinal axis L to a distal end 30. The mounting bracket 26 includes a hinge 32 extending transverse to the longitudinal axis L, with the hinge 32 defining the rake axis R therethrough.

The steering column assembly 20 further comprises a rake adjustment mechanism 34. The rake adjustment mechanism 34 rotationally adjusts the column jacket 24 and the rake bracket 28 about the rake axis R relative to the mounting bracket 26. The rake adjustment mechanism 34 also locks the column jacket 24 and the rake bracket 28 in position relative to the mounting bracket 26. There are several known rake adjustment mechanisms 34 capable of adjusting and locking the rake position of the column jacket 24 and the rake bracket 28 that may be incorporated into the subject invention. Accordingly, the rake adjustment mechanism 34 is not described in detail herein, and the scope of the claims should not be limited to the exact configuration or type of rake adjustment mechanism 34 utilized.

The column jacket 24 is supported by the mounting bracket 26 and detachably supported by the rake bracket 28. The column jacket 24 is longitudinally moveable relative to the mounting bracket 26 along the longitudinal axis L in response to an emergency event, i.e., the column jacket 24 is collapsible in response to an emergency event. The column jacket 24 is also pivotably moveable with the rake bracket 28 relative to the mounting bracket 26 about the rake axis R. A steering wheel 36 is attached to an end of the column jacket 24 as is well known in the art.

An instrument cluster 38 is coupled to the distal end 30 of the rake bracket 28. The instrument cluster 38 is rotatably moveable with the rake bracket 28 and the column jacket 24 relative to the mounting bracket 26 about the rake axis R. The instrument cluster 38 includes an outer casing 40, preferably manufactured from a plastic material. At least one gauge 42, and preferably a plurality of gauges 42 are supported by the outer casing 40. The gauges 42 typically include a speedometer, a tachometer, a fuel gauge, a temperature gauge, an oil pressure gauge, etc. It should be understood that the number and kind of gauges may vary depending upon the vehicular requirements, and that the scope of the claims are not limited to the number and kind of gauges.

Figure 3:
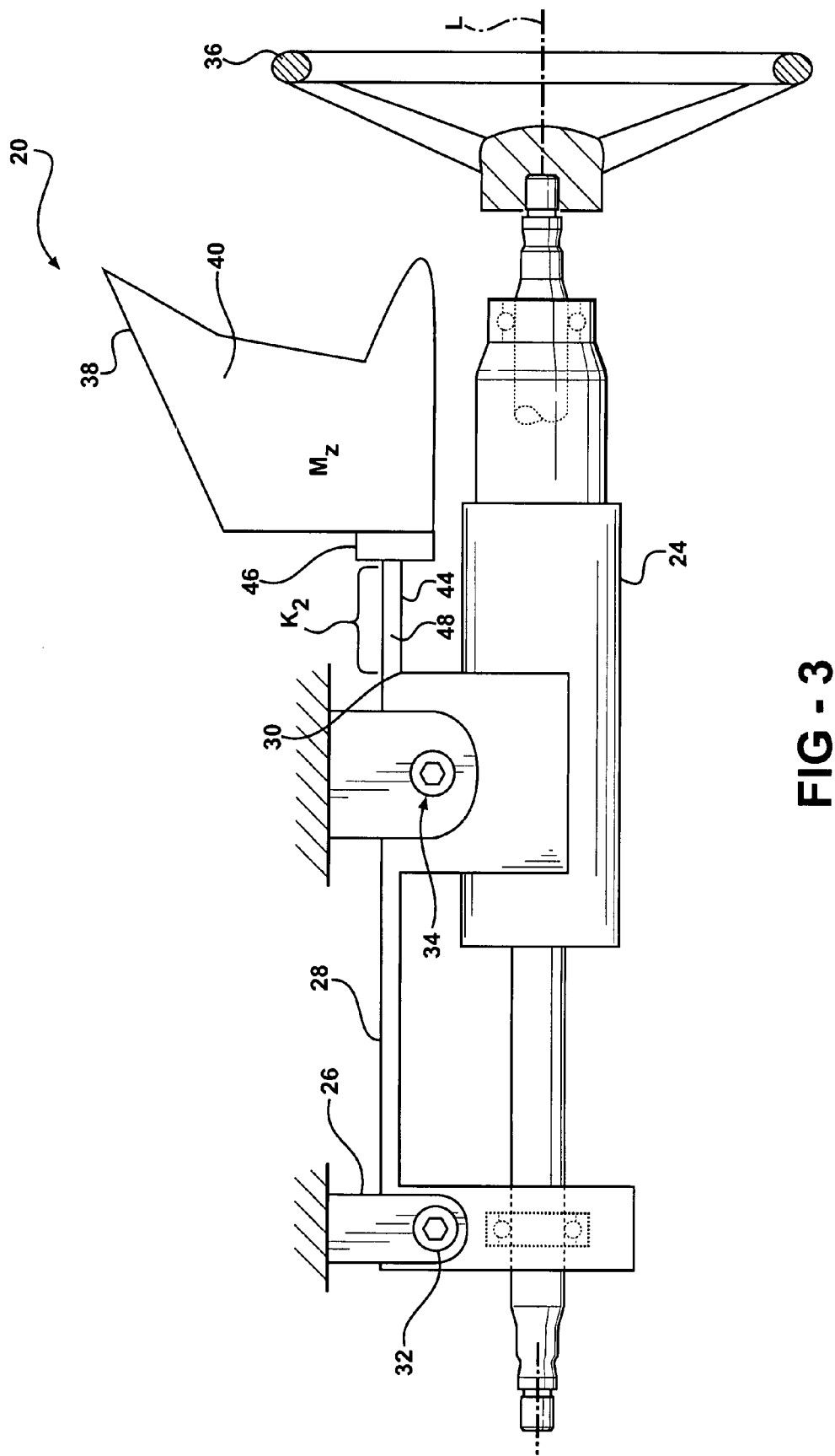
FIG. 3 is a schematic side view of the steering column assembly.

Referring also to FIG. 3, which is a schematic representation of the steering column assembly 20, the steering column assembly 20 further comprises a dynamic absorber 44 interconnecting the instrument cluster 38 and the rake bracket 28. The column jacket 24 and the attached steering wheel 36 vibrate at a resonance frequency as is well known in the art. The dynamic absorber 44 reduces the vibration transmitted to the instrument cluster 38 and also the vibration in the steering wheel 36. Preferably, the dynamic absorber 44 includes a linear spring 48 having a pre-determined spring constant $K_z$. The linear spring 48 supports the instrument cluster 38, which includes a mass $M_z$. The dynamic absorber 44 and the instrument cluster 38 are therefore cantilevered from the rake bracket 28. Accordingly, the mass $M_z$ of the instrument cluster 38 is coupled to the rake bracket 28 by the spring constant $K_z$ and cooperate together to counteract the vibration in the column jacket 24 to reduce the overall vibration in the instrument cluster 38 and the steering wheel 36. The linear spring 48 includes a cluster bracket 46. The cluster bracket 46 includes a flange 50 interconnecting the cluster bracket 46 and the instrument cluster 38. Accordingly, it should be understood that the outer casing 40 is attached to the flange 50 of the cluster bracket 46. The instrument cluster 38 is fixedly mounted to the dynamic absorber 44, and is therefore stationary relative to the mounting bracket 26 in response to the emergency event. It should be understood that the dynamic absorber 44 may include some other device capable of reducing vibration in the column jacket 24. Accordingly, the scope of the claims should not be limited to the exact configuration of the dynamic absorber 44 described herein.

As depicted in the embodiment shown in FIGS. 1 and 2 with reference to the schematic representation shown in FIG. 3, the dynamic absorber 44 is integral with the rake bracket 28. As such, the linear spring 48 is an extension of the rake bracket 28. The pre-determined spring constant $K_z$ is therefore dependent upon the geometric design of the dynamic absorber 44 and the material utilized to manufacture the dynamic absorber 44. As is known in the art, the ability to reduce vibration is a factor of the spring constant $K_z$ and the mass $M_z$ of the object interconnected by the dynamic absorber 44. Accordingly, the effect on vibration in the steering column assembly 20 by the dynamic absorber 44 is dependent upon the mass $M_z$ of the instrument cluster 38 and the spring constant $K_z$ of the dynamic absorber 44. Knowing the mass of the instrument cluster 38 and the physical properties of the material utilized for the dynamic absorber 44, one skilled in the art can customize the exact shape and configuration of the dynamic absorber 44 to best fit the specific design considerations and requirements.

It should be understood that upon an emergency event, the column jacket 24 collapses along the longitudinal axis L. As the column jacket 24 collapses, the column jacket 24 detaches from the rake bracket 28 as is well known in the art. Accordingly, the instrument cluster 38 remains fixed in place, continuously attached to the rake bracket 28 and stationary relative to the mounting bracket 26 and the instrument panel, thereby permitting proper operation of the collapsible column jacket 24 and the energy absorption mechanism 22.

Figure 4:
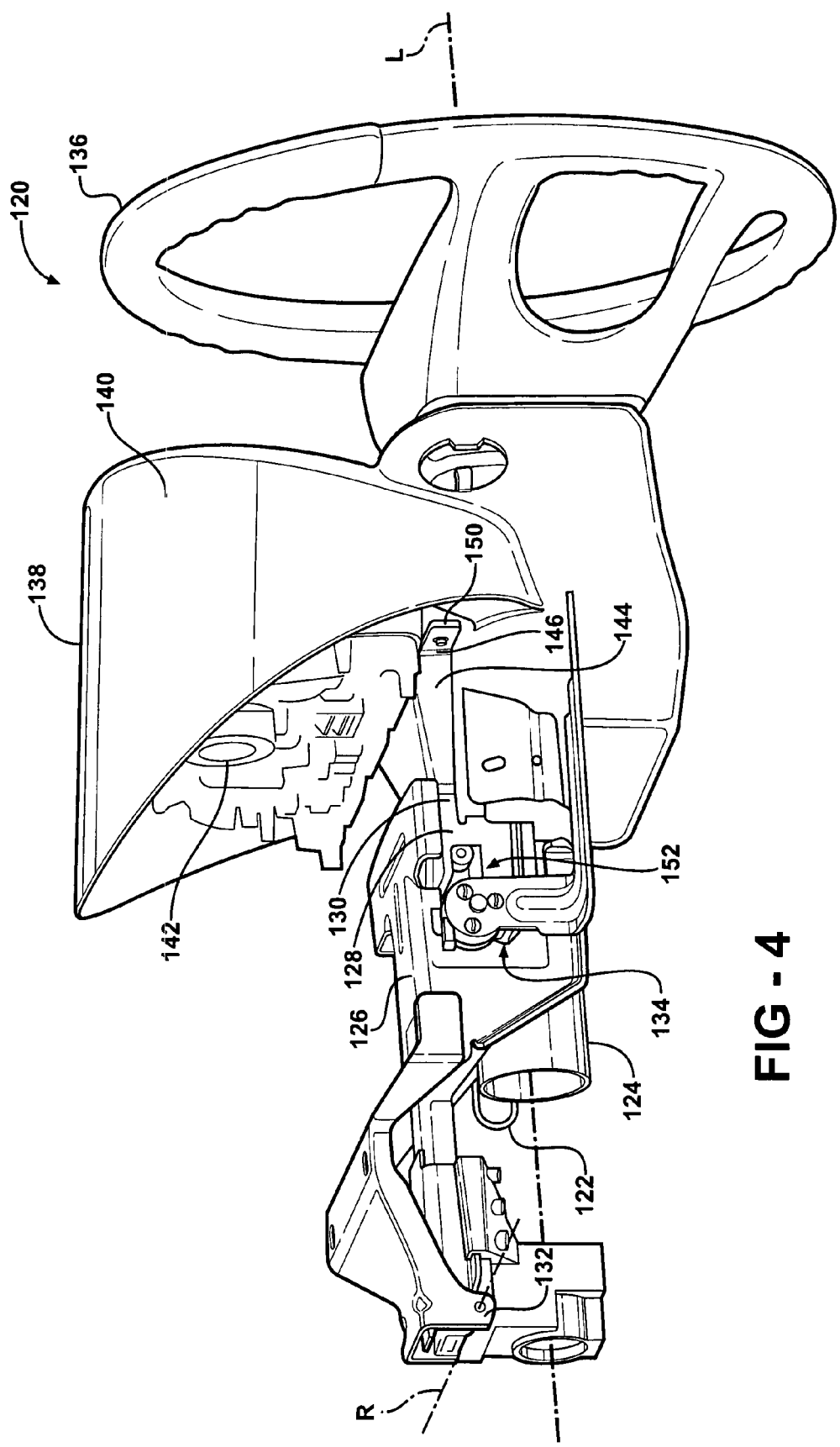
FIG. 4 is a perspective view of a first alternative embodiment of the steering column assembly.
Figure 5:
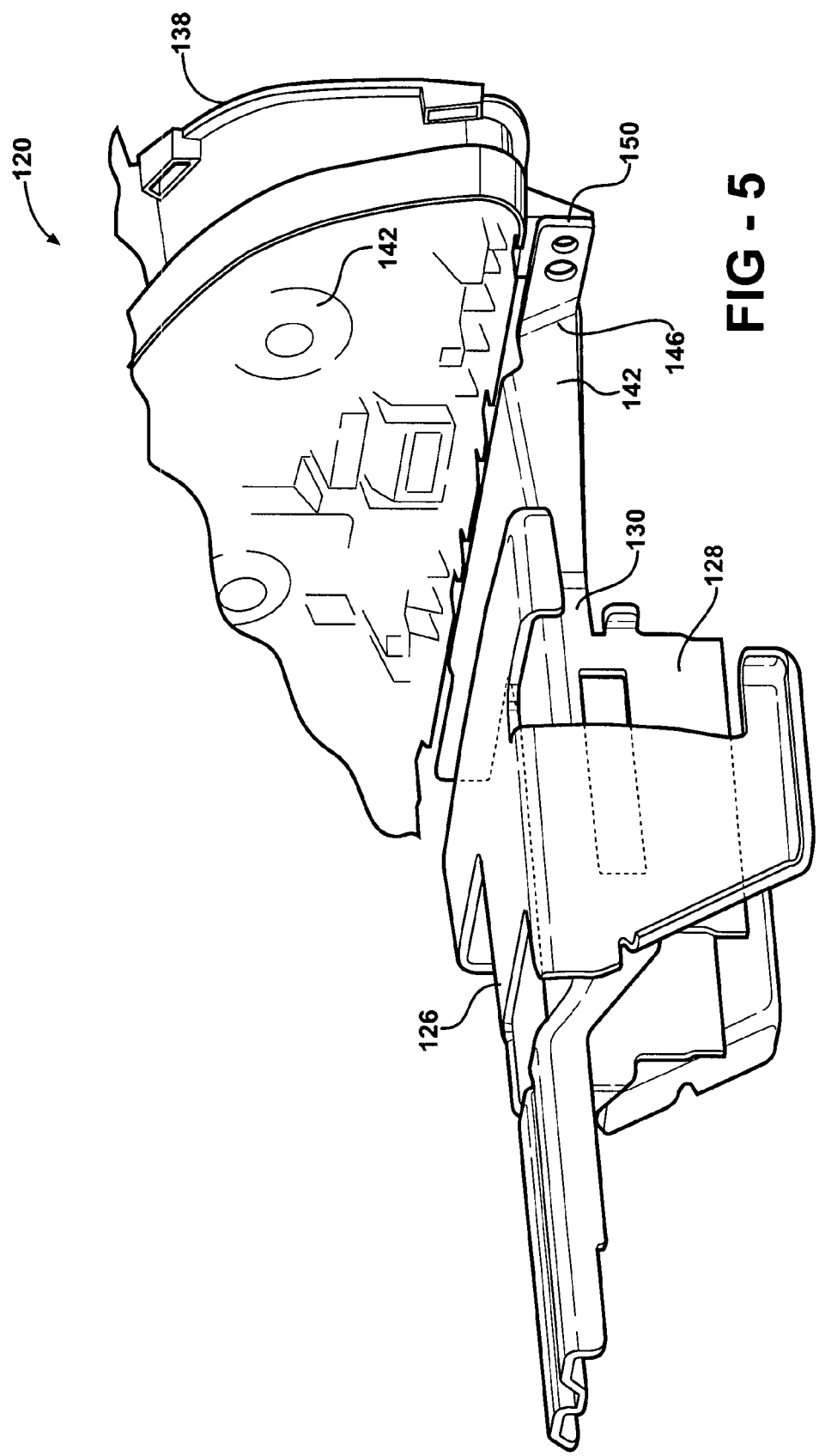
FIG. 5 is a partial fragmentary perspective view of the first alternative embodiment of the steering column assembly shown in FIG. 4.
Figure 6:
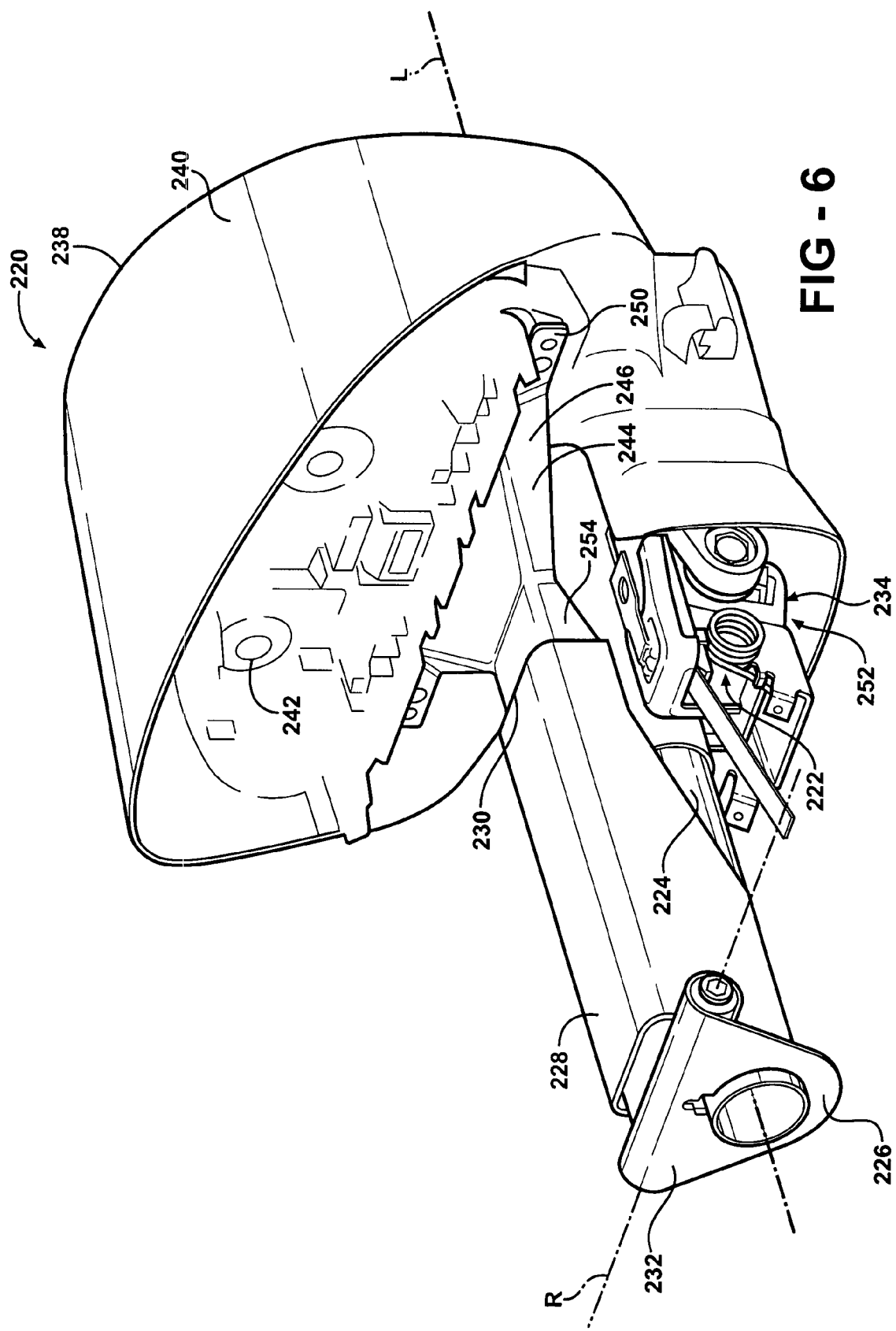
FIG. 6 is a perspective view of a second alternative embodiment of the steering column assembly.
Figure 7:
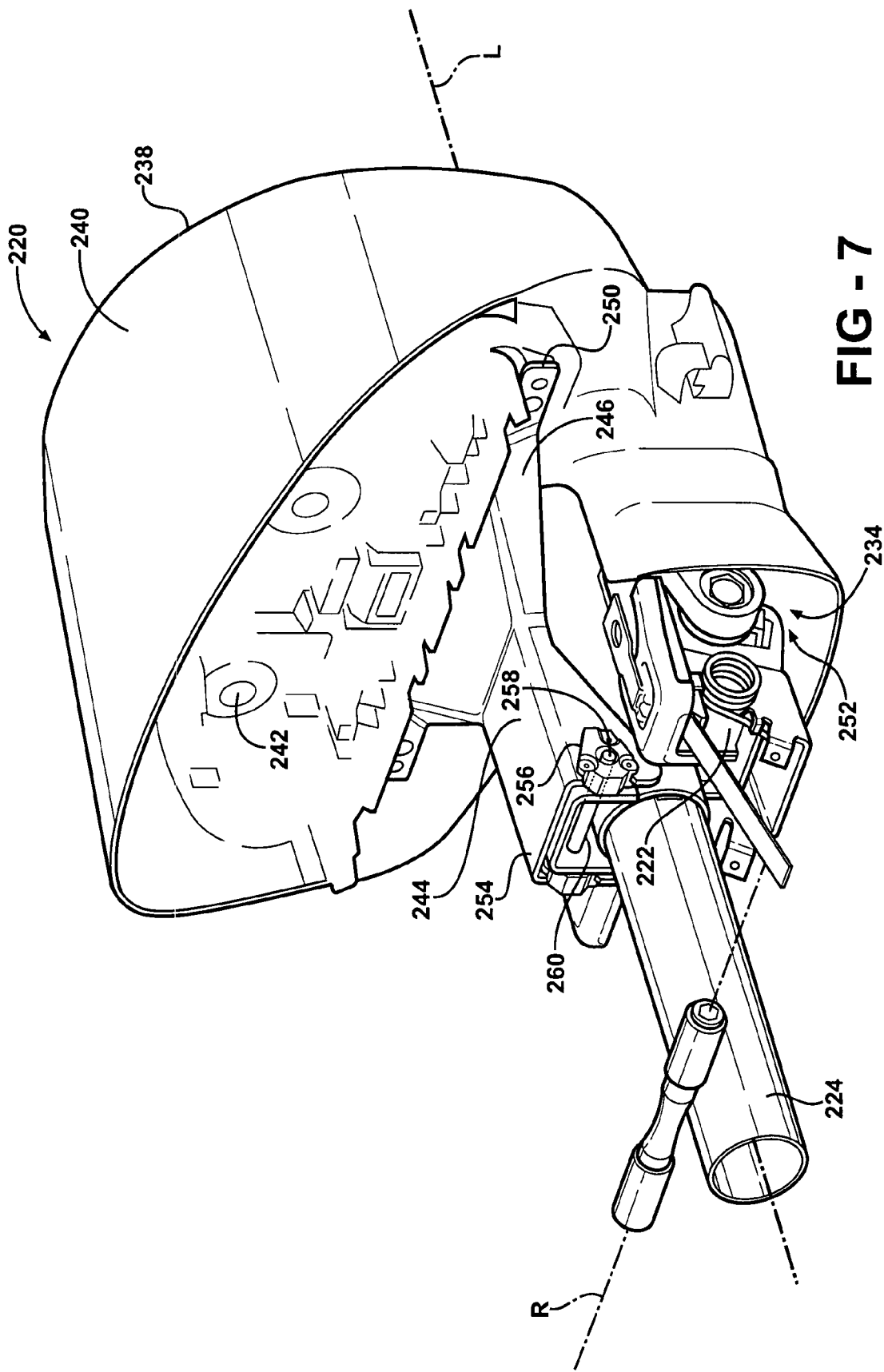
FIG. 7 is a partial perspective view of the second alternative embodiment of the steering column assembly shown in FIG. 6.
Figure 8:
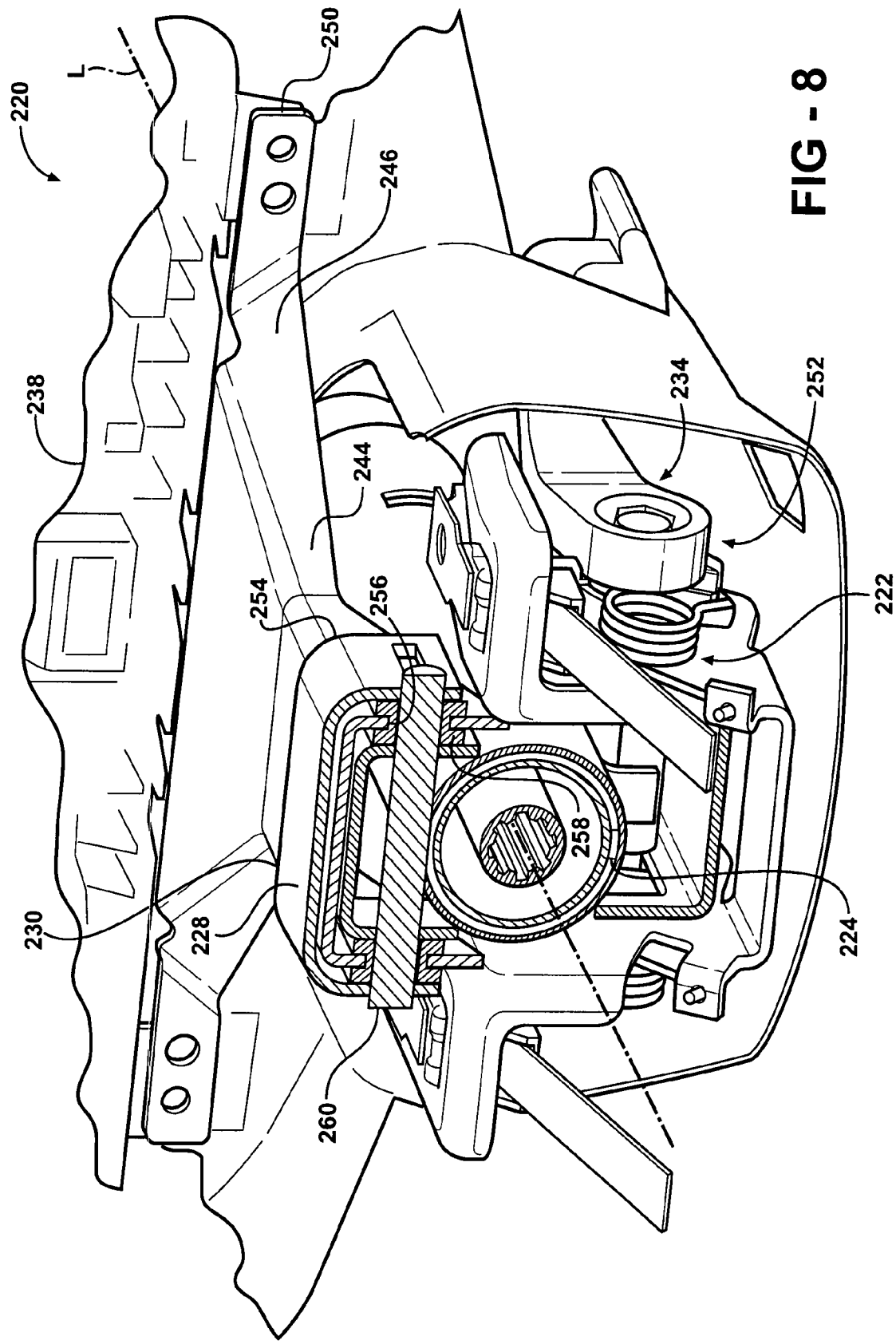
FIG. 8 is fragmentary cross sectional perspective view of the second alternative embodiment of the steering column assembly shown in FIG. 6.

A first alternative embodiment of the steering column assembly is generally shown at 120 in FIGS. 4 and 5. A second alternative embodiment of the steering column assembly is generally shown at 220 in FIGS. 6 through 8. Features of the steering column assembly 20 shown in FIGS. 1 and 2 that correspond to Features of the first alternative embodiment shown in FIGS. 4 and 5 are represented by the same reference numeral preceded by the numeral "1". Accordingly, the steering column assembly 20 shown in FIGS. 1 and 2 is referenced in the first alternative embodiment as the steering column assembly 120. Likewise, features of the steering column assembly 20 shown in FIGS. 1 and 2 that correspond to features of the second alternative embodiment shown in FIGS. 6 through 8 are represented by the same reference numeral preceded by the numeral "2". Accordingly, the steering column assembly 20 shown in FIGS. 1 and 2 is referenced in the second alternative embodiment as the steering column assembly 220.

Both the first and second alternative embodiments of the steering column assembly 120, 220 further comprise a telescoping mechanism 152, 252. The telescoping mechanism 152, 252 adjusts the column jacket 124, 224 axially along the longitudinal axis L. Also, the telescoping mechanism 152, 252 locks the column jacket 124, 224 in position relative to the mounting bracket 126, 226. There are several known telescoping mechanisms 152, 252 capable of adjusting and locking the telescoping position of the column jacket 124, 224 that may be incorporated into the subject invention. Accordingly, the telescoping mechanism 152, 252 is not described in detail herein and the scope of the claims should not be limited to the exact configuration or type of the telescoping mechanism 152, 252 utilized.

Referring to the first alternative embodiment shown in FIGS. 4 and 5, the rake bracket 128 is axially adjustable along the longitudinal axis L with the column jacket 124. The rake bracket 128 is in telescopic engagement with the mounting bracket 126 for axial movement along the longitudinal axis L relative to the mounting bracket 126. The dynamic absorber 144 is fixedly mounted to the rake bracket 128, and the instrument cluster 138 is fixedly mounted to the dynamic absorber 144. It should be understood that the dynamic absorber 144 of the first alternative embodiment is identical to and operates in the same manner as the dynamic absorber 44 described in relation to FIGS. 1 through 3.

The steering column assembly 120 of the first alternative embodiment allows the instrument cluster 138 to move with the column jacket 124 in both the rake direction and the telescoping direction during normal use. In response to the emergency event, the column jacket 124 collapses. As the column jacket 124 collapses, the column jacket 124 detaches from the rake bracket 128 and the instrument cluster 138. The instrument cluster 138, being fixedly mounted to the rake bracket 128 via the dynamic absorber 144, remains stationary relative to the mounting bracket 126 and the instrument panel, thereby permitting proper operation of the collapsible column jacket 124 and the energy absorption mechanism 122.

Referring to the second alternative embodiment shown in FIGS. 6 through 8, the dynamic absorber 244 includes an arm 254 in telescopic engagement with the rake bracket 228. The instrument cluster 238 is fixedly mounted to the dynamic absorber 244 and is axially moveable with the dynamic absorber 244 along the longitudinal axis L relative to the mounting bracket 226 in response to the emergency event. The dynamic absorber 244 defines a notch 256, and a release capsule 258 is disposed in the notch 256. A pin 260 extends through the column jacket 224, the release capsule 258 and the rake bracket 228 for interconnecting the column jacket 224, the dynamic absorber 244, and the rake bracket 228. It should be understood that the dynamic absorber 244 of the second alternative embodiment is identical to and operates in the same manner as the dynamic absorber 44 described in relation to FIGS. 1 through 3.

The steering column assembly 220 of the second alternative embodiment allows the instrument cluster 238 to move with the column jacket 224 in both the rake direction and the telescoping direction during normal use. In response to the emergency event, the column jacket 224 collapses. As the column jacket 224 collapses, the dynamic absorber 244 and the column jacket 224 remain coupled together, and both the column jacket 224 and the dynamic absorber 244 detach from the rake bracket 228. Accordingly, both the column jacket 224 and the dynamic absorber 244 collapse, and the instrument cluster 238 thereby moves relative to the mounting bracket 226 and the instrument panel during the emergency event.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A steering column assembly for a vehicle, said assembly comprising:
    a mounting bracket for attachment to the vehicle;
    a rake bracket coupled to said mounting bracket and pivotable relative to said mounting bracket about a rake axis with said rake bracket extending from said mounting bracket along a longitudinal axis to a distal end;
    a column jacket supported by said mounting bracket and detachably supported by said rake bracket and longitudinally moveable relative to said mounting bracket along said longitudinal axis in response to an emergency event and pivotably moveable with said rake bracket relative to said mounting bracket about said rake axis;
    an instrument cluster coupled to said distal end of said rake bracket and rotatably moveable with said rake bracket and said column jacket relative to said mounting bracket about said rake axis; and
    a dynamic absorber interconnecting said instrument cluster and said rake bracket for reducing vibration transmitted to said instrument cluster, said dynamic absorber including a linear spring having a pre-determined spring constant.

2. An assembly as set forth in claim 1 wherein said linear spring includes a cluster bracket having a flange interconnecting said cluster bracket and said instrument cluster.

3. An assembly as set forth in claim 2 wherein said instrument cluster includes an outer casing and at least one gauge supported by said outer casing with said outer casing attached to said flange of said cluster bracket.

4. An assembly as set forth in claim 1 wherein said mounting bracket includes a hinge extending transverse to said longitudinal axis and defining said rake axis.

5. An assembly as set forth in claim 1 further comprising a rake adjustment mechanism for rotationally adjusting said column jacket and said rake bracket about said rake axis relative to said mounting bracket and locking said column jacket and said rake bracket relative to said mounting bracket.

6. An assembly as set forth in claim 1 further comprising an energy absorption mechanism for absorbing energy transmitted through the column jacket in response to the emergency event.

7. An assembly as set forth in claim 1 further comprising a telescoping mechanism for adjusting said column jacket axially along said longitudinal axis and locking said column jacket relative to said mounting bracket.

8. An assembly as set forth in claim 7 wherein said rake bracket is axially adjustable along said longitudinal axis with said column jacket.

9. A steering column assembly for a vehicle, said assembly comprising:
    a mounting bracket for attachment to the vehicle;
    a rake bracket coupled to said mounting bracket and pivotable relative to said mounting bracket about a rake axis with said rake bracket extending from said mounting bracket along a longitudinal axis to a distal end;
    a column jacket supported by said mounting bracket and detachably supported by said rake bracket and longitudinally moveable relative to said mounting bracket along said longitudinal axis in response to an emergency event and pivotably moveable with said rake bracket relative to said mounting bracket about said rake axis, wherein said rake bracket is axially adjustable along said longitudinal axis with said column jacket;

an instrument cluster coupled to said distal end of said rake bracket and rotatably moveable with said rake bracket and said column jacket relative to said mounting bracket about said rake axis;

a dynamic absorber interconnecting said instrument cluster and said rake bracket for reducing vibration transmitted to said instrument cluster, wherein said instrument cluster is fixedly mounted to said dynamic absorber and stationary relative to said mounting bracket in response to the emergency event; and a telescoping mechanism for adjusting said column jacket axially along said longitudinal axis and locking said column jacket relative to said mounting bracket.

10. An assembly as set forth in claim 9 wherein said rake bracket is in telescopic engagement with said mounting bracket for axial movement along said longitudinal axis relative to said mounting bracket.

11. A steering column assembly for a vehicle, said assembly comprising:

a mounting bracket for attachment to the vehicle;

a rake bracket coupled to said mounting bracket and pivotable relative to said mounting bracket about a rake axis with said rake bracket extending from said mounting bracket along a longitudinal axis to a distal end, wherein said rake bracket is in telescopic engagement with said mounting bracket for axial movement along said longitudinal axis relative to said mounting bracket;

a column jacket supported by said mounting bracket and detachably supported by said rake bracket and longitudinally moveable relative to said mounting bracket along said longitudinal axis in response to an emergency event and pivotably moveable with said rake bracket relative to said mounting bracket about said rake axis, wherein said rake bracket is axially adjustable along said longitudinal axis with said column jacket; and a dynamic absorber interconnecting said instrument cluster and said rake bracket for reducing vibration transmitted to said instrument cluster, wherein said dynamic absorber includes an arm in telescopic engagement with said rake bracket.

12. An assembly as set forth in claim 11 wherein said instrument cluster is fixedly mounted to said dynamic absorber and axially moveable with said dynamic absorber along said longitudinal axis relative to said mounting bracket in response to the emergency event.

13. An assembly as set forth in claim 11 wherein said dynamic absorber defines a notch.

14. An assembly as set forth in claim 13 further comprising a release capsule disposed in said notch and a pin extending through said column jacket, said release capsule and said rake bracket for interconnecting said column jacket, said dynamic absorber, and said rake bracket.

15. A steering column assembly for a vehicle, said assembly comprising:

a mounting bracket for attachment to the vehicle;

a rake bracket coupled to said mounting bracket and pivotable relative to said mounting bracket about a rake axis with said rake bracket extending from said mounting bracket along a longitudinal axis to a distal end;

a column jacket supported by said mounting bracket and detachably supported by said rake bracket and longitudinally moveable relative to said mounting bracket along said longitudinal axis in response to an emergency event and pivotably moveable with said rake bracket relative to said mounting bracket about said rake axis;

an instrument cluster coupled to said distal end of said rake bracket and rotatably moveable with said rake bracket and said column jacket relative to said mounting bracket about said rake axis; and a dynamic absorber interconnecting said instrument cluster and said rake bracket for reducing vibration transmitted to said instrument cluster, wherein said dynamic absorber is fixedly mounted to said rake bracket.

16. An assembly as set forth in claim 15 wherein said instrument cluster is fixedly mounted to said dynamic absorber and stationary relative to said mounting bracket in response to the emergency event.

* * * * *